DISTRIBUTED HALL EFFECT MULTIPLIER

Filed Aug. 26, 1965

2 Sheets-Sheet 1

INVENTORS.
LUCIO M. VALLESE
LOUIS A. DeROSA
BY Charles Johnson Jr.
ATTORNEY

INVENTORS.
LUCIO M. VALLESE
LOUIS A. DeROSA
Charles L. Johnson Jr.
ATTORNEY

United States Patent Office 3,404,265
Patented Oct. 1, 1968

3,404,265

DISTRIBUTED HALL EFFECT MULTIPLIER

Lucio M. Vallese, Glen Ridge, and Louis A. De Rosa, Upper Montclair, N.J., assignors to International Telephone and Telegraph Corporation, Nutley, N.J., a corporation of Maryland Filed Aug. 26, 1965, Ser. No. 482,861
6 Claims. (Cl. 235—194)

ABSTRACT OF THE DISCLOSURE

A distributed Hall effect multiplier consisting of an elongated conductor slab and a parallel slab of Hall effect material magnetically coupled thereto, with pairs of output terminals spaced along the Hall effect slab, each pair coupled to an integrating circuit either directly or via a diode. In other embodiments the Hall effect material in the second slab is alternated with strips of ordinary conductor material, or is connected to a pair of output electrodes distributed along the length of the slab and the electrodes are in turn connected to a distributed capacitor via high resistivity plates.

This invention relates to apparatus for multiplying electrical signals and more particularly to multipliers which utilize the Hall effect.

In the past a number of electrical devices utilizing the Hall effect have been constructed. Briefly described, the Hall effect is the observed phenomenon that if a magnetic field is applied perpendicular to a current flow in any conductor, the moving charges constituting the current are deflected sideways and build up a potential difference between the two sides of the conductor. The creation of this transverse electrical field, perpendicular to both the magnetic field and the original current flow, is called the Hall effect. The prior art Hall effect multiplier devices have utilized a current carrying conductor of suitable material to form a path for an electrical signal. In conjunction with the electrical conductor, a winding and a magnetic structure have been provided. A second current is then introduced into the winding of the magnetic structure to produce a Hall effect voltage which is dependent upon both the first current and the current in the winding of the magnetic structure. The magnetic structure is not essential, but is used only for the purpose of magnifying the magnetic induction field.

These devices can only provide the product of two localized electrical quantities. In certain applications it is necessary to multiply two electrical quantities, such as currents or voltages, which are distributed along a line, for example, a transmission line, in space and which have wave-type characteristics, i.e. are functions of both time and space variables. In this case, conventional Hall effect multipliers can only provide the product of the waves at a particular point in space. If it is desired to obtain the product of the two waves as a function of space, it is necessary to make recourse to a number of distinct multipliers at different points in space, which will provide a discrete distribution of the product in space.

It is an object of this invention to provide an electrical multiplier which produces a distributed continuous multiplication of two signals in space.

It is another object of this invention to provide a frequency filter apparatus for the analysis of complex electrical signals.

It is an additional object of our invention to provide electrical apparatus which will automatically perform the mathematical operation of the convolution integral.

It is a feature of this invention to provide a first current carrying member. Located adjacent to this first current carrying member is a second current carrying member which is constructed of material having a large Hall effect constant. Each of the two current carrying members is part of a transmission line, so that the currents they carry constitute two waves travelling with the propagation characteristics of the transmission line of which they are a part. There is also attached to the Hall effect current carrying member, a number of output leads. The output leads are disposed in pairs so as to provide the Hall effect voltage which is a function of the two currents in the two conductors. Instead of the multiplicity of Hall effect output leads, a simple pair of high resistivity electrodes may be used to continuously detect or read the Hall voltage distribution along the lines. The apparatus may also be used to read the Fourier spectrum of a complex signal.

The above-mentioned and other features and objects of our invention will become more apparent by reference to the following description taken in conjunction with the accompanying drawings, in which.

Figures 1, 2, 3, 4:
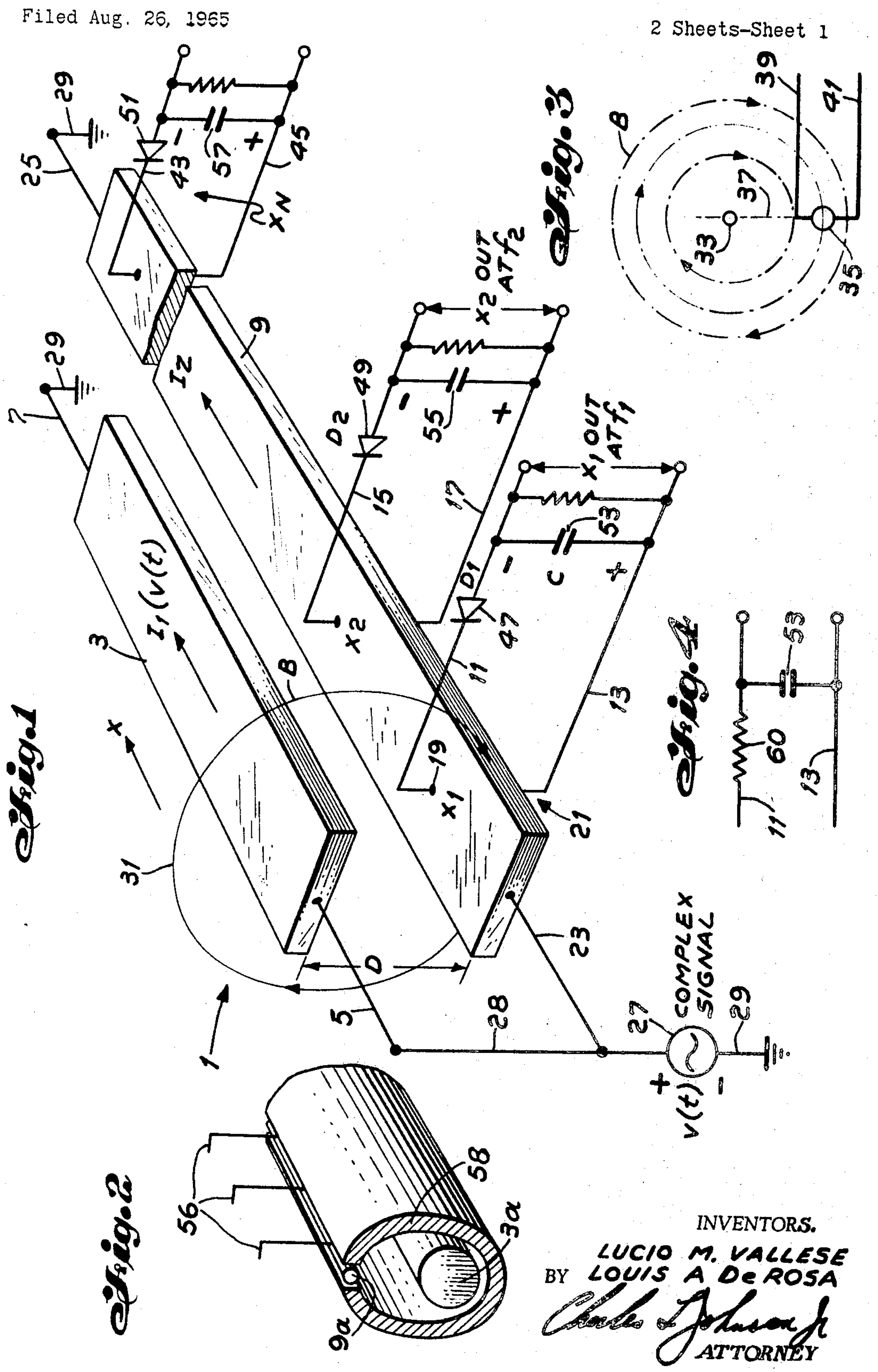
FIGURE 1 is a perspective view, partly schematic, of a basic embodiment of the multiplier.
FIGURE 2 is a perspective cross section of a second embodiment of the invention.
FIGURE 3 shows the essential geometry of the multiplier.
FIGURE 4 illustrates an integrator for use with the invention.

FIGURE 1 illustrates a basic embodiment of the apparatus of the invention. FIGURE 1 may function as a Hall effect multiplier or as a filter. The structure is designated generally as 1. There is shown a first electric current conducting member 3. The member is preferably made of a material of good electrical conductivity. The conductor 3 is provided with an input terminal 5 and an output terminal 7 connected to the opposite ends of the conductor 3. For convenience of illustration, the conductor 3 has been shown as a rectangular slab of conductive material. However, as will become clear later in the description, the conductor 3 need have no particular cross-sectional shape and may be round, oval, etc. The conductor 3, for convenience of assembly, may be surrounded by an insulating material, but this is not necessary. There is also provided a second current carrying conductor 9 which is disposed adjacent to the conductor 3, but separated from the conductor 3 by a distance D. The conductor 9 should be substantially parallel to the conductor 3. The length of the two conductors 3 and 9 need not be the same.

The second conductor 9 is preferably composed of material which exhibits a large Hall effect constant. There are a number of semi-conductor materials which exhibit a relatively large Hall effect voltage for given values of current I and flux B that are present in the materials. Such are, for example, indium antimonide, antimony, cobalt, zinc, iron, bismuth, copper, and aluminum. Generally indium antimonide is preferred because of its large Hall constant, but its use is not essential. Thus one of the two conductors 9, may be made of this preferred material, indium antimonide. Attached to the conductor 9 are a number of pairs of output leads such as 11 and 13, and 15 and 17 spaced along the length of conductor 9. Output lead 11 is firmly attached, at contact point 19, to the side of conductor 9 which is adjacent to the conductor 3. The contact point 19 may be a suitable electrode with ohmic contact to the conductor. The leads 11, 13, 15, and 17 may be ordinary conductive leads; for convenience they should be insulated except at the contact points. Likewise, lead 13 is firmly attached to the opposite side of the conductor 9 at a contact point 21. The contact point 21 does not show due to the perspective of FIGURE 1. The contact points 19 and 21 where the leads 11 and 13 are attached to conductor 9 are directly opposite each other. Hall output voltages appear across the terminals 11 and 13, and across each pair of output leads 15–17 etc., which are similarly arranged.

To appreciate how a Hall voltage is produced at the terminals 11 and 13, assume that a source of electromotive force such as the output state of a radio receiver or other source of complex signal is connected to the input 5 of the conductor 3 and to the input 23 of the conductor 9. The output terminal for the conductor 9 is shown as 25. For convenience of illustration, a single source of voltage 27 is shown connected to the conductors 9 and 3 by leads 28, 5, and 23. The source 27 passing a voltage through the lead 28 and the input terminal 5 will create a current $I_1$ which will travel along the conductor 3 as shown. This current will leave the conductor 3 by the output terminal 7 and return to the other terminal of the voltage source 27 by a suitable return path 29. The return path 29 may be a common ground connection or it may be a separate insulated wire and its exact nature is not here important. It will also be seen by way of illustration that the voltage source 27 will drive a second current $I_2$ through the conductor 9 as shown through the lead 23. This current $I_2$ will leave the conductor 9 by the output terminal 25 and return to the other terminal of the source 27 by return path 29. Load or other utilization devices may be used in output lines 7 and 25. For return, the common ground is used; only one return path for the two conductors 3 and 9 is necessary. Alternately each conductor 3 and 9 can have its own separate return wire connected to the output terminals 7 and 25.

To understand the generation of the Hall effect voltage at the terminals 11 and 13 or 15 and 17 etc., consider the current $I_1$ which is travelling or flowing in the conductor 3. The electric current sets up a magnetic field which lies in a plane at right angles to the direction of propagation of the current $I_1$. The magnetic induction field B caused by the current $I_1$ is shown as flux line 31. This flux B will encircle or enclose the conductor 3 and a particular line of flux will form a closed loop surrounding the current $I_1$. However, the lines of flux, of which a single one 31 is shown in FIG. 1, will extend for a considerable distance in space about the conductor 3. If the conductor 9 is placed adjacent to the conductor 3, some of the lines of flux such as 31 will pass through or cut the surface of the conductor 9 as shown. It will be seen that the magnetic flux B caused by the current $I_1$ in the conductor 3 is in orthogonal relationship with the current $I_2$ in the conductor 9 and is also in orthogonal relationship with a line drawn between the contact points 19 and 21 of the output leads 11 and 13. This is the necessary and sufficient physical relationship to generate a Hall voltage. The current $I_2$ in the conductor 9 is perpendicular to the flux B caused by the current $I_1$. There is a direct proportionality between the current $I_1$ and the flux density B intersecting the current $I_2$ in conductor 9. Hence along an axis, or surface, in orthogonal relationship to both the current $I_2$ and the flux B, at contacts 19 and 21, a Hall effect voltage will be produced. This voltage is conducted out through the output leads 11 and 13. Likewise at a distance further removed along the length of the conductor 9, the output leads 15 and 17 also produce a Hall effect voltage caused by the interaction of the current $I_2$ and the flux B caused by the current $I_1$. It will be thus seen and appreciated that by a very simple apparatus, a Hall effect voltage has been produced which is proportional to the product of two currents $I_1$ and $I_2$, since the flux B is directly related to the current $I_1$ by the physical constants of the permeability of free space and the magnitude of the current $I_1$. Note that in order to enhance the magnetic induction flux B which crosses the Hall effect conductor one may utilize a high permeability magnetic path such as that shown schematically in FIG. 2. Conductors 3A and 9A correspond to conductors 3 and 9 respectively of FIG. 1. Leads 56 are the Hall terminals, and the ferromagnetic material 58 acts as the magnetic circuit path to aid the flux generated by the current in the conductor 3A.

FIGURE 3 shows the basic essentials of a Hall effect multiplier using the principles of our invention. There is shown a first conductor 33 and a second conductor 35. Drawn across the second conductor 35 are Hall output leads 39 and 41. FIGURE 3 gives all the essential requirements of the geometrical arrangement to produce the Hall effect voltage. As we have mentioned, conductor 35 is made preferably of a material which exhibits a high Hall constant. The two conductors are disposed substantially parallel to each other so that the magnetic flux lines of conductor 33 are linked with conductor 35.

Returning now to FIGURE 1, it will be appreciated that on the Hall effect output leads such as 11 or 13 or 15 and 17 etc., Hall effect voltages are produced by the interaction of the two currents $I_1$ and $I_2$ coupled by the magnetic field B which is at right angles to the flow of current $I_1$. Any desired additional number of pairs of leads such as 15 and 17 may be disposed along the length of the conductor 9. The conductor 9 is shown partially broken away to indicate that other pairs of leads may be used. The last pair of leads is shown as 43 and 45 at a location designated as $X_n$ along the length of conductor 9 taking the X axis as lying along the length of the conductor 9.

The apparatus so far described provides for producing a distributed product of the current in the conductor 3 and the current in the conductor 9. This product is distributed in space along the X axis as shown. Thus if the conductor 3 has a different delay characteristic from the conductor 9, the product at the leads 11 and 13 at point $X_1$ in general will be different at the same instant from the product Hall voltage at the leads 15 and 17 at position $X_2$. It can also be appreciated that the input terminal 5 of the conductor 3 could have been connected to a separate distinct source of signals (not shown) rather than being connected to the same source of signals 27 to which the conductor 9 is connected. In the event that two separate sources of signals are connected respectively to the two conductors, the Hall voltages at the output leads such as 11 and 13 will represent the product of these two signals.

In FIG. 1 diodes such as 47, 49, and 51 act as gates, providing an ohmic path only when the Hall voltage has suitable polarity. As an example, in FIG. 1 the indicated polarity is shown; however, the opposite polarity could be selected as well. The output Hall voltage leads are finally connected to integrating circuits, such as for example R-C circuits, to provide the average value of the product. This makes possible the performing of the mathematical operation known as the convolution integral. The convolution integral is given in equation as:

(1) $G(T)=\int V_1(t)V_2(x-t)dt$

It will be seen that the convolution integral involves simultaneously the multiplication of two functions $V_1(t)$ and $V_2(x-t)$ while at the same time integrating the product of these two functions. The apparatus shown in FIG. 1 accomplishes this mathematical operation if the diodes are removed or replaced with linear resistors, as indicated at FIG. 4 by resistor 60 which acts with the capacitance 53 as an integrator. In fact, across the various capacitors 53, 55, 57, etc., a voltage distribution in space is found which represents the said convolution integral as a function of the parameter X expressed as distance variable. Of course, as pointed out, the said capacitors 53, 55, 57 etc., may be replaced with other suitable integrators.

Note that, if the diodes 47, 49, 51 etc., are actually utilized one obtains a distribution corresponding to the summation of Hall voltages of the same sign only. This may be accomplished by combining the individual outputs. This may be useful for particular applications. Similarly, of course, one may arrange the polarities of the various diodes so that any desired combination of signs of the Hall voltages may be considered.

Figures 5, 6, 7:
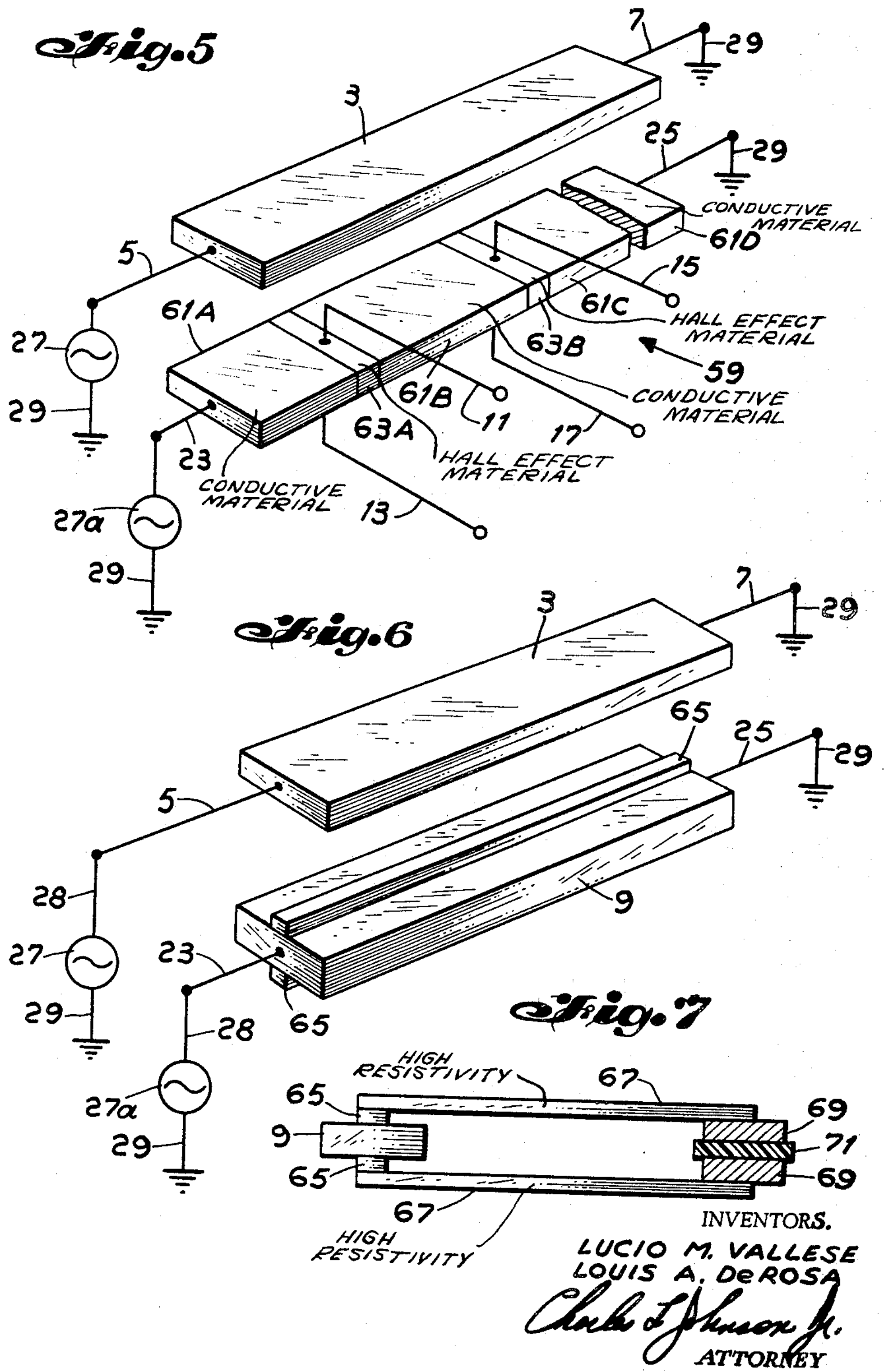
FIGURE 5 is a perspective view of a third embodiment of our invention.
FIGURE 6 is a perspective schematic view of a fourth embodiment of the invention.
FIGURE 7 is an end view of the Hall conductor, illustrating a fifth embodiment of our invention.

FIGURE 5 shows a multiplier similar to that shown in FIGURE 1 but with some variations. All identical parts are identified by the same numbers in both figures. Two sources of electromotive force, 27 and **27*a* are shown. As in FIG. 1, a first conductor 3 of good electric conductivity is disposed adjacent to the second conductor generally designated as 59. The second conductor 59 is composed of sections of ordinary conductors 61, such as 61A, 61B, 61C, 61D, and so on. At the locations along the length of the conductor 59 where it is desired to take off the Hall effect voltage, small sections or strips, such as 63A, 63B, etc., of a different material which exhibits a high Hall effect constant have been inserted in intimate contact with the sections of ordinary conductor 61. These sections such as 63A, 63B and so on may be made, for example of a semiconductive material such as indium antimonide. The inserted strips 63** of Hall effect material provide a simpler construction with a considerable saving in cost and better mechanical construction. The details of the electrical connections are similar to those of the previous embodiment shown in FIG. 1.

FIGURE 6 illustrates a further embodiment of our invention. As in the previously described embodiments, there are two conductors 3 and 9, 3 being made of ordinary conducting material and 9 being made of material of a high Hall constant. The discrete Hall electrodes across conductor 9 are replaced with continuous Hall electrodes 65 having high resistivity. All other electrical connections are similar to those of FIGURE 1, except that two separate power sources are shown.

The Hall voltage distribution is now a continuous function of the space distance and may be read out by suitable means, such as mechanical or electrical scanning, electroluminescent display, etc. The readout quantity may also be integrated distributively if it is connected by means of suitable high resistivity plates to a distributed capacitor.

FIGURE 7 illustrates an embodiment of the invention providing this feature. An end view of the Hall effect conductor 9 is shown. Connected to the continuous Hall electrodes 65 are high resistivity plates 67 leading to the conducting plates 69 of a distributed capacitor with an insulator 71 between the two plates 69. The readout of the voltage distribution across the distributed capacitor may be effected by various suitable continuous or discontinuous means and directly provides the convolution integral.

While we have described above the principles of our invention in connection with specific apparatus, it is to be clearly understood that this description is made only by way of illumination and not as a limitation to the scope of our invention as set forth in the objects thereof and in the accompanying claims.

We claim:

1. A distributed multiplier comprising:
a first elongated current conducting member
a second elongated current conducting member constructed at least partially of Hall effect material distributed along the length thereof and disposed substantially parallel to and adjacent said first member, and
output electrode means distributed along the length of said Hall effect conductor.

2. A distributed multiplier according to claim 1 wherein the output electrode means comprises:
a plurality of pairs of output leads, each of said pairs of output leads comprising
a first lead connected to one side of said second elongated conductor and adjacent to said first elongated conductor and
a second lead connected to the opposite side of the second elongated conductor away from said first elongated conductor said pairs of output leads being spaced along the length of said second conductor.

3. A distributed multiplier according to claim 2 further including integrating means comprising a RC circuit connected between each of the aforesaid pairs of output leads.

4. A distributed multiplier according to claim 2 further including averaging means connected between each of the plurality of aforesaid first leads and second leads.

5. A distributed multiplier according to claim 1 wherein the second current conducting member comprises an elongated conductor constructed of Hall effect material, and
a pair of continuous high resistivity output electrodes in contact with the elongated conductor along the length thereof.

6. A distributed multiplier according to claim 5 further including
a distributed capacitor, and
two high resistivity plates connecting said electrodes to said capacitor.

References Cited

UNITED STATES PATENTS

| | | | |
|---|---|---|---|
| 2,767,911 | 10/1956 | Hollingsworth. | |
| 3,021,459 | 2/1962 | Grubbs et al. | |
| 3,121,788 | 2/1964 | Hilbinger. | |
| 3,179,864 | 4/1965 | Kramer. | |
| 3,218,480 | 11/1965 | Zellmer | 235—194 X |

MALCOLM A. MORRISON, *Primary Examiner.*

J. F. RUGGIERO, *Assistant Examiner.*